United States Patent [19]

Maruyama et al.

[11] Patent Number: 4,519,274
[45] Date of Patent: May 28, 1985

[54] AUTOMATIC SPEED RANGE CHANGE-OVER SYSTEM FOR A HYDRO-MECHANICAL TRANSMISSION

[75] Inventors: Ryoichi Maruyama; Takayoshi Nishijima; Hideaki Aida, all of Yokohama; Hideyuki Konishi, Kamakura; Keiji Hatayama, Yokohama, all of Japan

[73] Assignee: Kabushiki Kaisha Komatsu Seisakusho, Tokyo, Japan

[21] Appl. No.: 465,663

[22] Filed: Feb. 10, 1983

[30] Foreign Application Priority Data

Feb. 17, 1982 [JP] Japan ................... 57-22820

[51] Int. Cl.³ .................. B60K 41/18; F16H 47/04
[52] U.S. Cl. ........................... 74/866; 74/687; 74/714
[58] Field of Search ............ 74/866, 687, 714; 364/424.1

[56] References Cited

U.S. PATENT DOCUMENTS

| | | | |
|---|---|---|---|
| 3,815,698 | 6/1974 | Reed | 74/720.5 X |
| 3,890,360 | 6/1975 | Pruvot et al. | 74/866 X |
| 4,107,776 | 8/1978 | Beale | 74/866 X |
| 4,131,035 | 12/1978 | Mizuno et al. | 74/866 |
| 4,220,059 | 9/1980 | Mizuno et al. | 74/866 X |
| 4,229,998 | 10/1980 | Mizuno et al. | 74/866 |
| 4,253,347 | 3/1981 | Mizuno et al. | 74/866 X |
| 4,261,229 | 4/1981 | Mizuno et al. | 74/866 |
| 4,309,917 | 1/1982 | Leet | 74/687 X |
| 4,319,501 | 3/1982 | Sugimoto | 74/866 |
| 4,386,688 | 6/1983 | Sato et al. | 74/866 X |

Primary Examiner—George H. Krizmanich
Assistant Examiner—Dirk Wright
Attorney, Agent, or Firm—Armstrong, Nikaido, Marmelstein & Kubovcik

[57] ABSTRACT

An automatic speed range change-over system for a hydro-mechanical transmission of a vehicle including a mechanical transmission having a plurality of speed range change-over clutches and pairs of hydraulic pumps and motors, each motor being operatively connected to the mechanical transmission.

The speed range change-over system includes an engine speed detector, a pair of motor speed detectors and a plurality of fluid pressure detection switches for selectively detecting a currently engaged clutch. Signals from the engine speed detector, motor speed detectors and fluid pressure detection switches are fed into an arithmetic unit where relative number of revolutions between the clutch elements of another clutch adjacent to the clutch currently engaged is calculated based upon those signals and a relative number of revolutions signal is sent out therefrom.

The relative number of revolutions signal is fed into a comparator and is compared with a predetermined value stored therein. The comparator sends out a signal only when the relative number of revolutions becomes less than the predetermined value. The signal from the comparator is fed into a speed range change-over signal generator for generating a signal thereby directing pressurized fluid into the adjacent clutch to be engaged so as to engage the same.

Upon engagement of the adjacent clutch, the fluid pressure detection switch sends out a signal to thereby disengage the clutch currently engaged.

3 Claims, 2 Drawing Figures

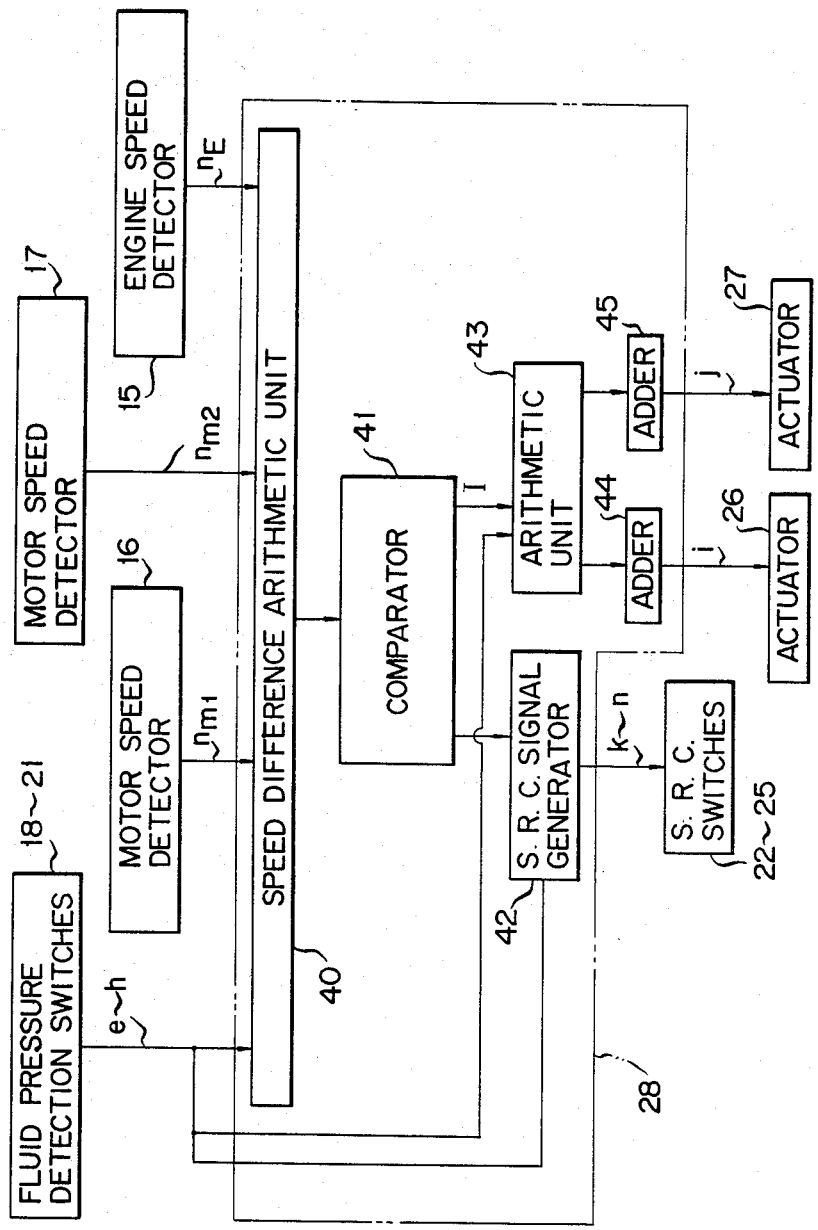

AUTOMATIC SPEED RANGE CHANGE-OVER SYSTEM FOR A HYDRO-MECHANICAL TRANSMISSION

BACKGROUND OF THE INVENTION

This invention relates to an automatic speed range change-over system for a hydro-mechanical drive and steering transmission of a vehicle.

A hydro-mechanical transmission is disclosed in U.S. Pat. No. 3,815,698 issued to Reed wherein power applied to the input of the transmission is utilized for hydraulic drive and steer in forward and reverse of a first range, and combined hydraulic drive and mechanical drive are utilized in a second higher range wherein steer remains a function of the hydraulic portion of the transmission. The transmission also includes a hydro-mechanical third range. Hydrostatic transmissions are characterized by a very high gain which provides a very rapid response to small control inputs, thereby requiring an accurate control and preferably a slow acting control to avoid abrupt changes of ratio. When a hydrostatic transmission has its output coupled to a multi-range gear set, thus providing a hydro-mechanical transmission, control of the hydrostatic unit ratio becomes important in avoiding undesirable shocks to the power train during range shifting of the gear set.

SUMMARY OF THE INVENTION

It is therefore an object of the present invention to provide an automatic speed range change-over system for a hydro-mechanical transmission of a vehicle which enables a smooth speed range change-over to be obtained.

Another object of the present invention is to provide an automatic speed range change-over system for a hydro-mechanical transmission of a vehicle which can significantly reduce wears of speed range change-over clutches and prolong their service life.

In accordance with an aspect of the present invention, there is provided an automatic speed range change-over system for a hydro-mechanical transmission of a vehicle including an engine, mechanical transmission means connected to the engine and having a plurality of speed range change-over clutches each having clutch elements to be engaged, a pair of hydraulic pumps driven by the engine, and a pair of hydraulic motors each driven by the respective hydraulic pumps and operatively connected to the mechanical transmission, said speed range change-over system comprising: engine speed detector means for detecting actual engine speed and generating a first signal; motor speed detector means for detecting the speed of the hydraulic motors and generating a second signal; means for selectively detecting one of the speed range change-over clutches currently engaged and generating a third signal; arithmetic unit means for calculating relative number of revolutions between the clutch elements of another clutch adjacent to the one clutch currently engaged based upon the first, second and third signals fed therein and generating a fourth signal indicating the relative number of revolutions between the clutch elements of the another clutch; comparator means for comparing the relative number of revolutions with a predetermined value stored therein and generating a fifth signal if the relative number of revolutions becomes less than the predetermined value; means for generating speed range chang-over signal based upon the fifth signal; fluid supplying means for supplying fluid to the speed range change-over clutches; and switch means responsive to the fifth signal for directing fluid from said fluid supplying means to the another clutch to be engaged; upon engagement of the another clutch said means for selectively detecting one of the speed range change-over clutch currently engaged being adapted to send out a sixth signal to said means for generating speed range change-over signal thereby disengaing the one clutch currently engaged.

The above and other objects, features and advantages of the present invention will be readily apparent from the following description taken in conjunction with the accompanying drawings.

BRIEF DESCRIPTION OF THE DRAWINGS

FIG. 2 is a block diagram of an automatic speed range change-over system according to the present invention.

DESCRIPTION OF THE PREFERRED EMBODIMENT

Figure 1:
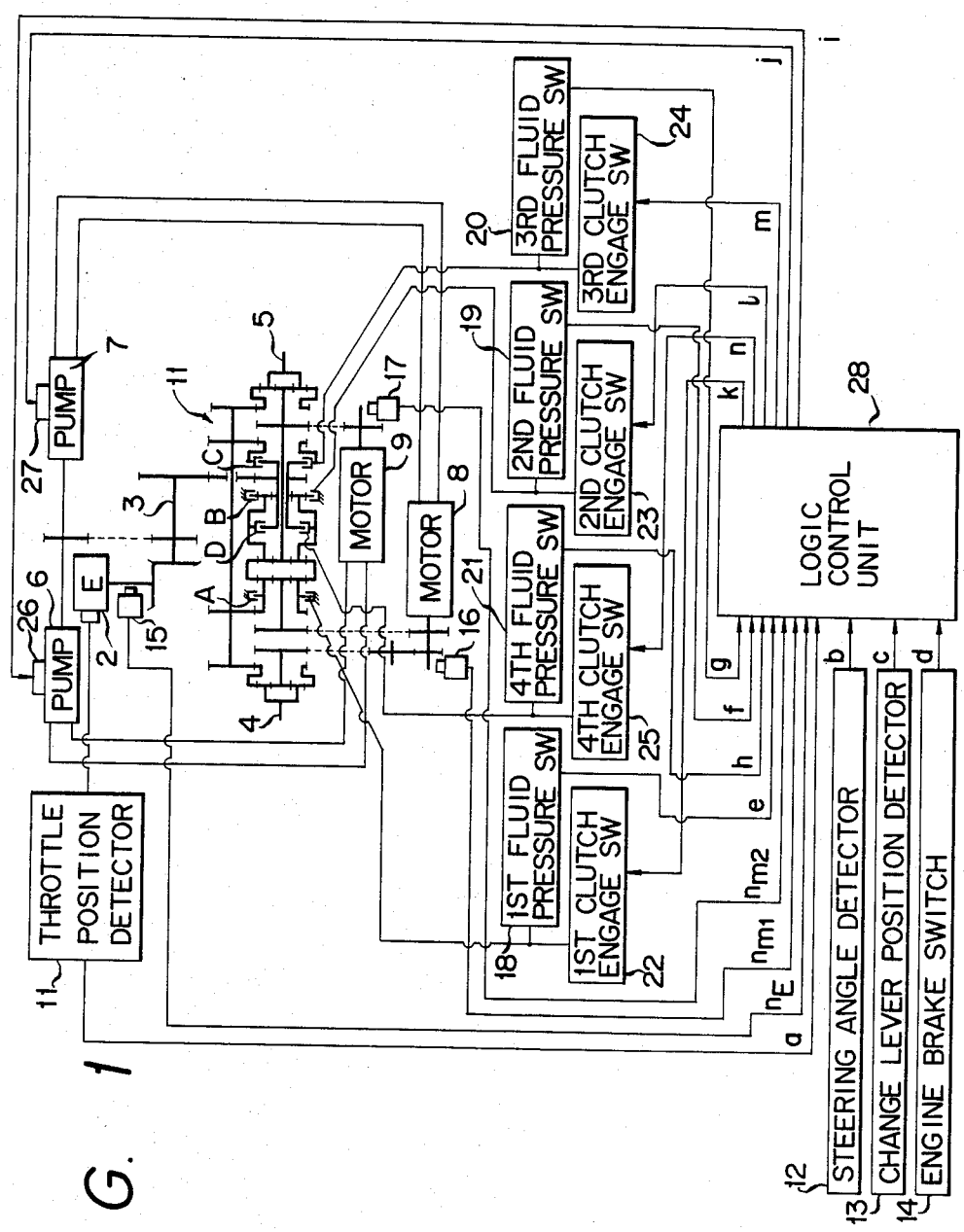
FIG. 1 is a block diagram showing an overall control system of a hydro-mechanical transmission of a vehicle employing an automatic speed range change-over system according to the present invention.

The present invention will now be described by way of example only with reference to the accompanying drawings.

FIG. 1 is a block diagram showing an overall control system of a hydro-mechanical transmission employing a speed range change-over system according to the present invention.

In the drawings, reference numeral 1 denotes a mechanical transmission having an input shaft 3 connected to an engine 1, and two (left and right) output shafts 4 and 5; 6 and 7 two (left and right) hydraulic pumps driven by the engine 2; and 8 and 9 hydraulic motors driven by the pressurized fluid discharged from the hydraulic motors 6 and 7, respectively. Both the output shafts of the hydraulic motors 8 and 9 are connected to the mechanical transmission 1. The control of the hydraulic motors 8 and 9 enables the transmission 1 to effect stepless speed controls. The mechanical transmission 1 has a first speed range clutch A, a second speed range clutch B, a third speed range clutch C and a fourth speed range clutch D. The arrangement is made such that selective actuation of the respective clutches A, B, C and D enables the number of rotations of the output shafts 4, 5 to be changed into any of the first to fourth speeds.

Reference numeral 11 denotes a throttle position detector means adapted to detect the position of the throttle which controls the number of revolutions of the engine 2 and send out a signal "a"; 12 a steering angle detector adapted to detect the angle of rotation of a steering and generate a signal b; 13 a change lever postion detector adapted to detect four positions of the change lever; that is, forward run, reverse run, neutral and spin turn positions of the change lever and take out a signal c corresponding thereto; 14 an engine brake switch adapted to take out a signal d for applying an engine brake, and 15 an engine speed detector adapted to take out an engine speed signal $n_E$ corresponding to the actual engine speed. Reference numerals 16 and 17 denote motor speed detectors adapted to take out speed signals $n_{m1}$ and $n_{m2}$ of the hydraulic motors 8 and 9, respectively, 18, 19, 20 and 21 fluid pressure detection switches adapted to detect the fluid pressure applied to the first, second, third and fourth speed range clutches A, B, C and D, respectively, and take out signals e, f, g and h corresponding thereto; 22, 23, 24 and 25 clutch engage switches adapted to control the aforementioned first, second, third and fourth speed range clutches A, B, C and D, respectively; and 26 and 27 actuators adapted to control the amount of fluid displacement of the hydraulic pumps 6 and 7, respectively.

Reference numeral 28 denotes a logic control unit which is adapted to receive the above-mentioned input signals a, b, c, d, e, f, g, h and $n_E$, $n_{m1}$ and $n_{m2}$ and send out, in response to the input signals, output signals i and j to the actuators 26 and 27 adapted to control the amount of the fluid displacement of the hydraulic pumps 6 and 7, respectively, and output signals k, l, m and n to the first, second, third and fourth clutch engage switches 22, 23, 24 and 25, respectively.

The transmission shown in FIG. 1 comprises a mechanical four-speed range transmission and an infinitely variable speed transmission at each speed range based on hydraulic motors 8 and 9. In this kind of transmission, if change-over is made when the relative speed between the clutch discs and clutch plates of an adjacent upper clutch ($N_{up}$) or adjacent lower clutch ($N_{down}$) is zero, then the speed ratio at each speed range will become continuous so that it may serve as an infinitely variable speed transmission as a whole. As a result, the wear of the friction plate of each clutch will be reduced thereby increasing the service-life thereof, and by increasing the surface of the friction plate the clutch can be made more compact.

An example of the change-over system according to the invention will be described with reference to FIG. 2.

An engine speed signal $n_E$ generated by an engine speed detector 15, motor speed signals $n_{m1}$ and $n_{m2}$ generated by the left and right motor speed detectors 16 and 17, a speed range signal e, f, g or h generated by a fluid pressure detection switch 18, 19, 20 or 21 for a speed range currently in use are all sent to a speed difference arithmetic unit 40 where the operation of the relative speed $N_{up}$ or $N_{down}$ of an adjacent upper clutch or adjacent lower clutch is made. The relative speed $N_{up}$ or $N_{down}$ thus obtained is compared with a predetermined value $N_c$ by a comparator 41. Consequently, if the value of the relative speeds $N_{up}$ or $N_{down}$ has become less than $N_c$, the time for effecting speed range change is reached. When $N_{up}$ has become smaller than $N_c$ or $N_{down}$ has become smaller than $N_c$, respective signals will be sent to a speed range change-over signal generator 42. The speed range change-over signal generator 42 will send any one of signals k, l, m and n to any one of speed range chang-over switches 22, 23, 24 and 25 to energize the same to thereby supply pressurized fluid to the adjacent speed range clutch to be subsequently engaged.

When the adjacent or next speed range clutch is filled with pressurized fluid thus raising the clutch fluid pressure, corresponding one of the fluid pressure detection switches 18, 19, 20 and 21 is energized so as to send any one of signals e, f, g and h to the speed range change-over signal generator 42 which in turn sends any one of signals k, l, m and n to the previous speed range change-over switch 22, 23, 24 or 25 to thereby disengage the previous speed range clutch.

Further, the value of the aforementioned $N_c$ is set at a speed difference so as to cause neither shock nor wear of the clutch when the change-over thereof is made.

As a result of comparison of the relative speed $N_{up}$ or $N_{down}$ with $N_c$ by the comparator 41, if $N_{up}$ or $N_{down}$ is larger than $N_c$, no change-over signal is generated, and so no change-over of the clutch is made.

Further, because there is a time interval during the above-mentioned speed change, if the speed ratio changes, then the relative speed of the clutch elements will also change thereby causing problems on the wear of the clutch etc. Therefore, when $N_{up}$ or $N_{down}$ has become smaller than $N_c$ and the timing for speed change is reached, a speed difference signal I is generated from the comparator 41. This signal I is compared for operation with any one of speed range signal at that time out of the speed range signals e, f, g and h from the fluid pressure detection switches 18, 19, 20 and 21 by means of the arithmetic unit 43 so that signals i and j to render the value of the speed difference signal I zero may be sent as outputs from adders 44 and 45 to the actuators 26 and 27 for controlling the amount of the pressurized fluid discharged by the hydraulic pumps 6 and 7, respectively. The signals i and j will be continuously sent to the actuators 26 and 27, respectively, until the speed change is completed.

The above-mentioned adders 44 and 45 are arithmetic units which function to add speed difference signal $+I$ and $-I$ to the signals i and j being generated from the adders at a given moment.

Since the present invention is arranged as mentioned hereinabove, the speed ratios among the plurality of speed ranges are continuous and so the transmission can be made as a whole in the form of an infinitely variable speed transmission. Further, the relative sliding movements of each clutch can be reduced thereby reducing the wear of each clutch and extend the service life thereof.

What is claimed is:

1. An automatic speed range change-over system for a hydro-mechanical transmission of a vehicle including an engine, mechanical transmission means connected to the engine and having a plurality of speed range change-over clutches each having clutch elements to be engaged, a pair of hydraulic pumps driven by the engine, and a pair of hydraulic motors each driven by the respective hydraulic pumps and operatively connected to the mechanical transmission, said speed range change-over system comprising:

engine speed detector means for detecting actual engine speed and generating a first signal;

motor speed detector means for detecting the speed of the hydraulic motors and generating a second signal;

means for selectively detecting one of the speed range change-over clutches currently engaged and generating a third signal;

arithmetic unit means for calculating relative number of revolutions between the clutch elements of an other clutch adjacent to the one clutch currently engaged based upon the first, second and third signals fed therein and generating a fourth signal indicating the relative number of revolutions between the clutch elements of said other clutch;

comparator means for comparing the relative number of revolutions with a predetermined value stored therein and generating a fifth signal if the relative number of revolutions becomes less than the predetermined value;

means for generating speed range change-over signal based upon the fifth signal;

fluid supplying means for supplying fluid to the speed range change-over clutches; and switch means responsive to the speed range change-over signal for directing fluid from said fluid supplying means to said other clutch to be engaged;

upon engagement of said other clutch said means for selectively detecting one of the speed range change-over clutch currently engaged being adapted to send out a sixth signal to said means for generating speed range change-over signal thereby disengaging the one clutch currently engaged.

2. An automatic speed range change-over system according to claim 1 wherein said comparator means is adapted to send out a seventh signal indicating a difference between the relative number of revolutions of said other clutch and the predetermined value and wherein said system further comprises second arithmetic unit means for operating the third and seventh signals and generating an eighth signal;

a pair of actuators for controlling displacement volume of the associated hydraulic pumps; and a pair of adder means each connected with said second arithmetic unit means and said respective actuators, each of said adder means being adapted to feed the eighth signal and send out a ninth or tenth signal to said respective actuators, said ninth and tenth signals being such signals which will gradually approximate said seventh signal to zero.

3. An automatic speed range change-over system according to claim 1 wherein said means for selectively detecting one of the speed range change-over clutches currently engaged comprises a plurality of fluid pressure detection switches for detecting fluid pressure of the speed range change-over clutches.

* * * * *